(12) United States Patent
Kremin et al.

(10) Patent No.: US 12,561,027 B1
(45) Date of Patent: Feb. 24, 2026

(54) PHASE CALIBRATION FOR CAPACITANCE TOUCH SENSING DEVICE

(71) Applicant: Cypress Semiconductor Corporation, San Jose, CA (US)

(72) Inventors: Viktor Kremin, Lviv (UA); Roman Ogirko, Lviv (UA); Oleksandr Pirogov, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 18/899,466

(22) Filed: Sep. 27, 2024

(51) Int. Cl.
*G06F 3/041* (2006.01)
*G06F 3/044* (2006.01)

(52) U.S. Cl.
CPC ........ *G06F 3/0418* (2013.01); *G06F 3/04164* (2019.05); *G06F 3/0446* (2019.05)

(58) Field of Classification Search
CPC ... G06F 3/0418; G06F 3/04164; G06F 3/0446
See application file for complete search history.

(56) References Cited

U.S. PATENT DOCUMENTS

| | | | | |
|---|---|---|---|---|
| 9,235,280 | B1 * | 1/2016 | Mohindra ............. | G06F 3/0446 |
| 9,348,451 | B2 * | 5/2016 | Wilson ................ | G06F 3/04166 |
| 9,459,738 | B2 * | 10/2016 | Lin ........................ | G06F 3/0418 |
| 12,299,235 | B2 * | 5/2025 | Newby .............. | G07C 9/00309 |
| 2007/0064976 | A1 * | 3/2007 | England ................. | G01S 7/481 |
| | | | | 382/106 |

| | | | | |
|---|---|---|---|---|
| 2008/0157867 | A1 * | 7/2008 | Krah ..................... | G06F 3/0445 |
| | | | | 329/304 |
| 2011/0231139 | A1 * | 9/2011 | Yokota .................. | G06F 3/0418 |
| | | | | 702/104 |
| 2013/0167613 | A1 * | 7/2013 | Kokawa ................ | G01F 23/263 |
| | | | | 73/1.73 |
| 2014/0176489 | A1 * | 6/2014 | Park .................... | G06F 3/04166 |
| | | | | 345/174 |
| 2015/0109212 | A1 * | 4/2015 | Yao ........................ | G06F 3/0446 |
| | | | | 345/173 |
| 2015/0160783 | A1 * | 6/2015 | Kaneko ................. | G06F 3/0418 |
| | | | | 345/174 |
| 2015/0370366 | A1 * | 12/2015 | Johnson .............. | G06F 3/04164 |
| | | | | 345/174 |
| 2016/0370949 | A1 * | 12/2016 | Park ...................... | G06F 3/0418 |
| 2017/0010717 | A1 * | 1/2017 | Kim ...................... | G06F 3/0446 |
| 2018/0004348 | A1 * | 1/2018 | Shepelev ............... | G06F 3/041 |
| 2018/0004350 | A1 * | 1/2018 | Bassett .................... | G06T 7/74 |
| 2019/0196653 | A1 * | 6/2019 | Yarosh .................. | G06F 3/0446 |

(Continued)

*Primary Examiner* — Amy Onyekaba

(57) ABSTRACT

In an embodiment of the techniques presented herein, a touch detection system includes a touch sensor array having transmit lines, receive lines, and unit cells defined at intersections of the transmit lines and the receive lines, a transmit sequencer configured to generate a transmit signal on the transmit lines, an analog-to-digital-converter module configured to measure responses of the unit cells to the transmit signal, and a calibration unit configured to determine a first phase offset for a first unit cell of the unit cells based on a first response, of the responses, of the first unit cell, determine a second phase offset for a second unit cell of the unit cells based on a second response, of the responses, of the second unit cell, and set a phase offset parameter of the touch sensor array based on the first phase offset and the second phase offset.

20 Claims, 6 Drawing Sheets

(56) References Cited

U.S. PATENT DOCUMENTS

2019/0265813 A1*   8/2019  Tanuma  ................. G06F 3/044
2023/0350494 A1*  11/2023  Sathe  ................... G06F 3/0418
2023/0367423 A1*  11/2023  Park  .................... G06F 3/04182
2024/0160314 A1*   5/2024  Jeon  .................... G06F 3/04166

* cited by examiner

200

SELECT FIRST UNIT CELL — 204

PERFORM SOURCE PHASE CALIBRATION FOR FIRST UNIT CELL TO GENERATE FIRST PHASE OFFSET — 206

SELECT SECOND UNIT CELL — 208

PERFORM SOURCE PHASE CALIBRATION FOR SECOND UNIT CELL TO GENERATE SECOND PHASE OFFSET — 210

CONFIGURE PHASE OFFSET PARAMETER BASED ON FIRST PHASE OFFSET AND SECOND PHASE OFFSET — 212

300

SELECT UNIT CELL FOR CALIBRATION — 304

INITIALIZE TOUCH SENSING SYSTEM — 306

SET INITIAL VALUE OF PHASE OFFSET — 308

318 — INCREMENT PHASE OFFSET

LOAD PHASE OFFSET REGISTER — 310

PERFORM SCAN — 312

DETERMINE RESPONSE OF UNIT CELL FOR GIVEN PHASE OFFSET — 314

MAX PHASE OFFSET? — 316
N
Y

DETERMINE PEAK RESPONSE — 320

DETERMINE PHASE OFFSET FOR PEAK RESPONSE — 322

128

500

Before Calibration

502

After Calibration

504

PHASE CALIBRATION FOR CAPACITANCE TOUCH SENSING DEVICE

BACKGROUND

Computing devices, such as notebook computers, personal data assistants (PDAs), mobile handsets, etc. have user interface devices, such as touch-sensor pads (also commonly referred to as touchpads), touch-sensor sliders, touch-sensor buttons, touch-sensor keyboards, touch screens, touch panels, etc. Capacitance-sensing devices are, at times, used to replace mechanical buttons, knobs, and other similar mechanical user interface controls in user interface devices. Capacitance-sensing devices have relatively few complicated mechanical switches and buttons, and can generally provide reliable operation under harsh conditions. In addition, capacitance-sensing devices are widely used in modern customer applications, allowing new user interface options to be developed relatively easily in existing products.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

In an embodiment of the techniques presented herein, a method for touch detection comprises determining a first phase offset for a first unit cell of a touch sensor array, determining a second phase offset for a second unit cell of the touch sensor array, and setting a phase offset parameter of the touch sensor array based on the first phase offset and the second phase offset.

In an embodiment of the techniques presented herein, a touch detection system comprises a touch sensor array comprising transmit lines, receive lines, and unit cells defined at intersections of the transmit lines and the receive lines, a transmit sequencer configured to generate a transmit signal on the transmit lines, an analog-to-digital-converter module configured to measure responses of the unit cells to the transmit signal, and a calibration unit configured to determine a first phase offset for a first unit cell of the unit cells based on a first response, of the responses, of the first unit cell, determine a second phase offset for a second unit cell of the unit cells based on a second response, of the responses, of the second unit cell, and set a phase offset parameter of the touch sensor array based on the first phase offset and the second phase offset.

In an embodiment of the techniques presented herein, a device comprises a display comprising a touch sensor array having transmit lines, receive lines, and unit cells defined at intersections of the transmit lines and the receive lines, a transmit sequencer configured to generate transmit signals on the transmit lines of the touch sensor array, an analog-to-digital-converter module configured to measure responses of the receive lines to the transmit signals, and a calibration unit configured to determine a first phase offset for a first unit cell of the unit cells based on a first response, of the responses, of the first unit cell, determine a second phase offset for a second unit cell of the unit cells based on a second response, of the responses, of the second unit cell, and set a phase offset parameter for at least one of one or more transmit lines of the transmit lines or one or more receive lines of the receive lines based on the first phase offset and the second phase offset.

In an embodiment of the techniques presented herein, a system for touch detection comprises means for determining a first phase offset for a first unit cell of a touch sensor array, means for determining a second phase offset for a second unit cell of the touch sensor array, and means for setting a phase offset parameter of the touch sensor array based on the first phase offset and the second phase offset.

DETAILED DESCRIPTION

Figure 1:
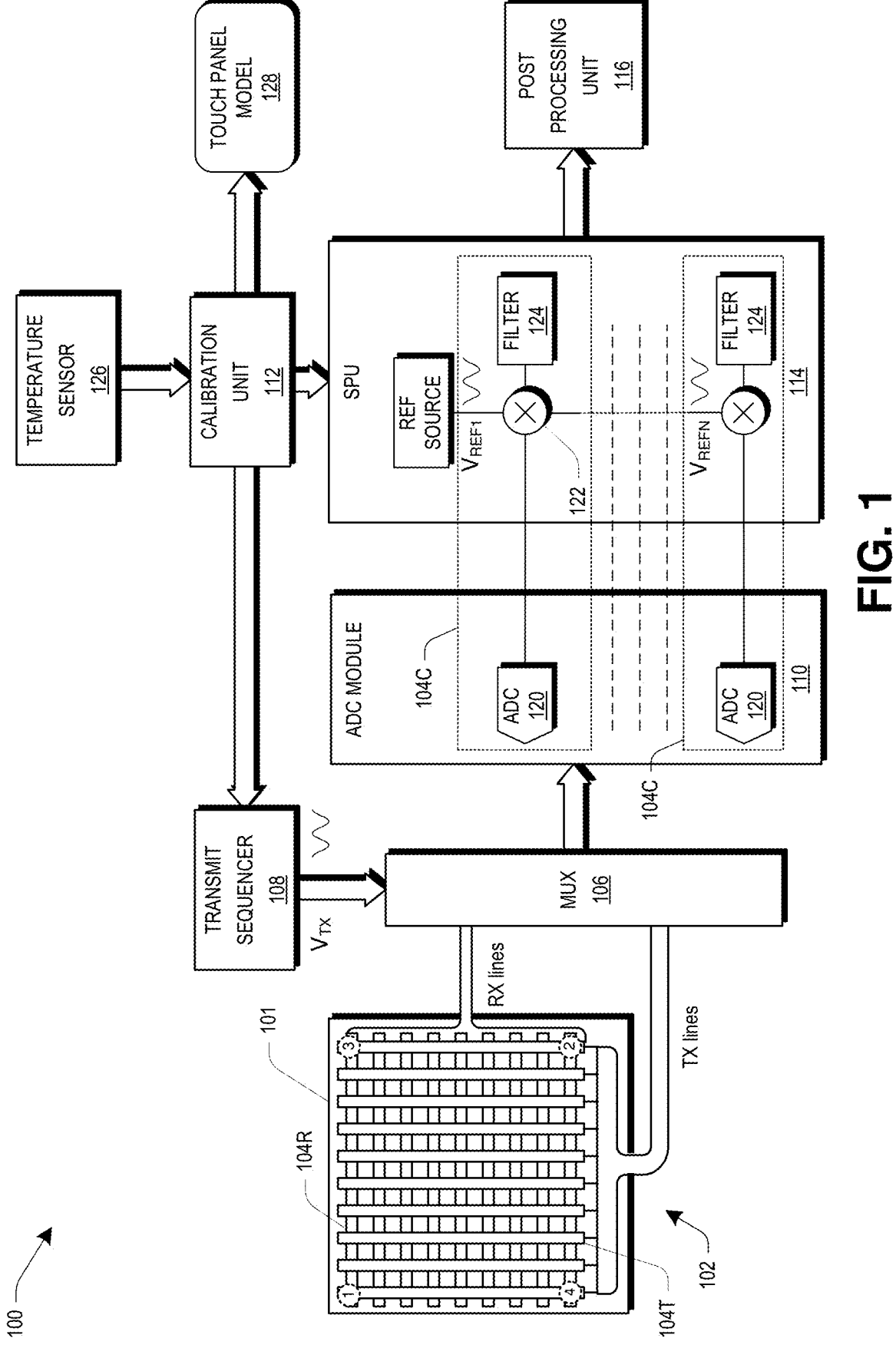
FIG. 1 is a block diagram of a touch sensing system, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

FIG. 1 is a block diagram of a touch sensing system 100, in accordance with some embodiments. In some embodiments, the touch sensing system 100 comprises a touch panel 101 (typically optically bounded to a display) comprising a touch sensor array 102 comprising transmission (TX) lines 104T and receive (RX) lines 104R, a multiplexer 106, a transmit sequencer 108, an analog-to-digital converter (ADC) module 110, a calibration unit 112, a signal processing unit (SPU) 114, and a post processing unit 116. In some embodiments, one or more of the calibration unit 112, the SPU 114, or the post processing unit 116 may be implemented by a shared processing resource.

In some embodiments, the touch sensing system 100 employs capacitive sensing to determine a touch position on a human machine interface (HMI) that provides user input to a device, such as a smartphone, a tablet, a laptop computer, a controller, or some other user interface. The HMI may employ a touch sensitive display that acts as an output device and an input device. The TX lines 104T and the RX lines 104R define a grid of orthogonal electrodes. The crossing points of the TX lines 104T and the RX lines 104R define unit cells of the touch sensor array 102. In some embodiments, the TX lines 104T are vertical and the RX lines 104R are horizontal. Alternatively, TX lines 104T can be horizontal and RX lines 104R can be vertical in some embodiments.

A transmit signal ($V_{TX}$) (e.g., an excitation signal) is injected on one or more selected TX lines 104T and the responses to the transmit signal are measured on the RX lines 104R. For example, the responses of the RX lines 104R may be measured in parallel responsive to the excitation of a single TX line 104T using multiple sensing channels 104C in the ADC module 110. In some embodiments, the transmit signal ($V_{TX}$) is a slew rate limited signal, such as a sinusoidal signal, a trapezoidal signal, or some other signal type. The TX injection and RX measurement is repeated for each of the TX lines 104T until a scan cycle is completed. The transmit sequencer 108 controls the transmit signal on a TX line 104T selected by the multiplexer 106. In some embodiments, the multiplexer 106 routes each of the RX lines 104R to an individual sensing channel 104C so that the responses can be measured in parallel. In some embodiments, each sensing channel 104C comprises an ADC 120 in the ADC module 110 and a demodulator 122 and a filter 124 in the SPU 114. The demodulator 122 multiplies the output of the ADC 120 by a demodulator reference signal ($V_{REF1}\div V_{REFN}$) to demodulate the RX response, and the filter 124 filters the demodulated output, for example, noise filtering, baseline filtering, hardware debounce filtering, or some other filtering. In some embodiments, the ADC 120 is implemented as a sigma-delta modulator and the filter 124 is a sinc filter or a sinc filter chain with differing decimation ratios for the filters in the chain. In some embodiments, the same demodulator reference signal ($V_{REF}$) is used for each sensing channel 104C. In another embodiment, each sensing channel 104C may employ a different demodulator reference signal ($V_{REF1 \ldots N}$).

The SPU 114 processes data generated by the ADC 120 for each of the TX lines 104T to generate response data for the touch sensor array 102. In some embodiments, the SPU 114 processes the data from the ADCs 120 for noise reduction, gain equalization, etc. The post processing unit 116 processes the response data to recognize touch events, calculate one or more touch positions (e.g., single touch or multi-touch), determine touch properties, such as movement direction, or recognize gestures (e.g., over multiple scan cycles).

The performance of the sensor array 102 is affected by signal propagation delay inherent in the TX lines 104T and the RX lines 104R. The lines 104T, 104R each have distributed line resistance and distributed line capacitance that increase as a function of length for a particular unit cell location and a parasitic capacitance that occurs between adjacent lines 104T, 104R. The phase delay between the transmit signal ($V_{TX}$) and receiver input current ($I_{RX}$) depends on the RX and TX intersection position (e.g., unit cell position). Each TX line 104T and RX line 104R may be represented as a lumped delay line, where the net delay from the intersecting lumped delay lines depends on the position of the unit cell. For example, the unit cell at position 2 exhibits the least amount of delay compared to an ideal situation where the receive current ($I_{RX}$) is shifted 90° from the transmit voltage ($V_{TX}$). The unit cell at position 1 exhibits the highest delay compared to the ideal situation, and the unit cells at positions 3 and 4 exhibit intermediate delays.

In some embodiments, the calibration unit 112 determines one or more phase offset parameters based on measured delays to account for touch signal non-uniformity across the surface of the touch sensor array 102. The sensing channels 104C are sensitive to the phase of the input current. The touch sensor array 102 comprises conductive transparent materials with finite conductivity and, due to panel parasitic capacitances, the input current phase and amplitude varies across the unit cells. The calibration unit 112 configures at least one phase offset parameter to account for phase variation across the touch sensor array 102. In some embodiments, the calibration unit 112 receives temperature data from a temperature sensor 126 to trigger calibration events. In some embodiments the calibration can be done periodically to compensate for potential aging effects.

Figure 2:
FIGS. 2 and 3 are diagrams of methods for phase calibration of a touch sensing system, in accordance with some embodiments.
Figure 2:
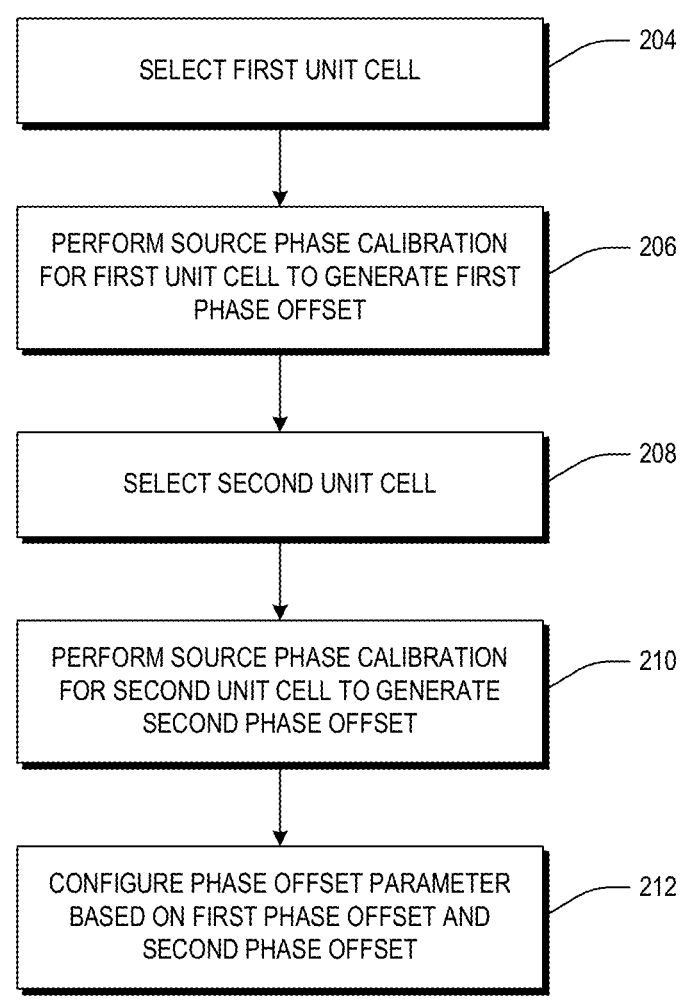
Figure 3:
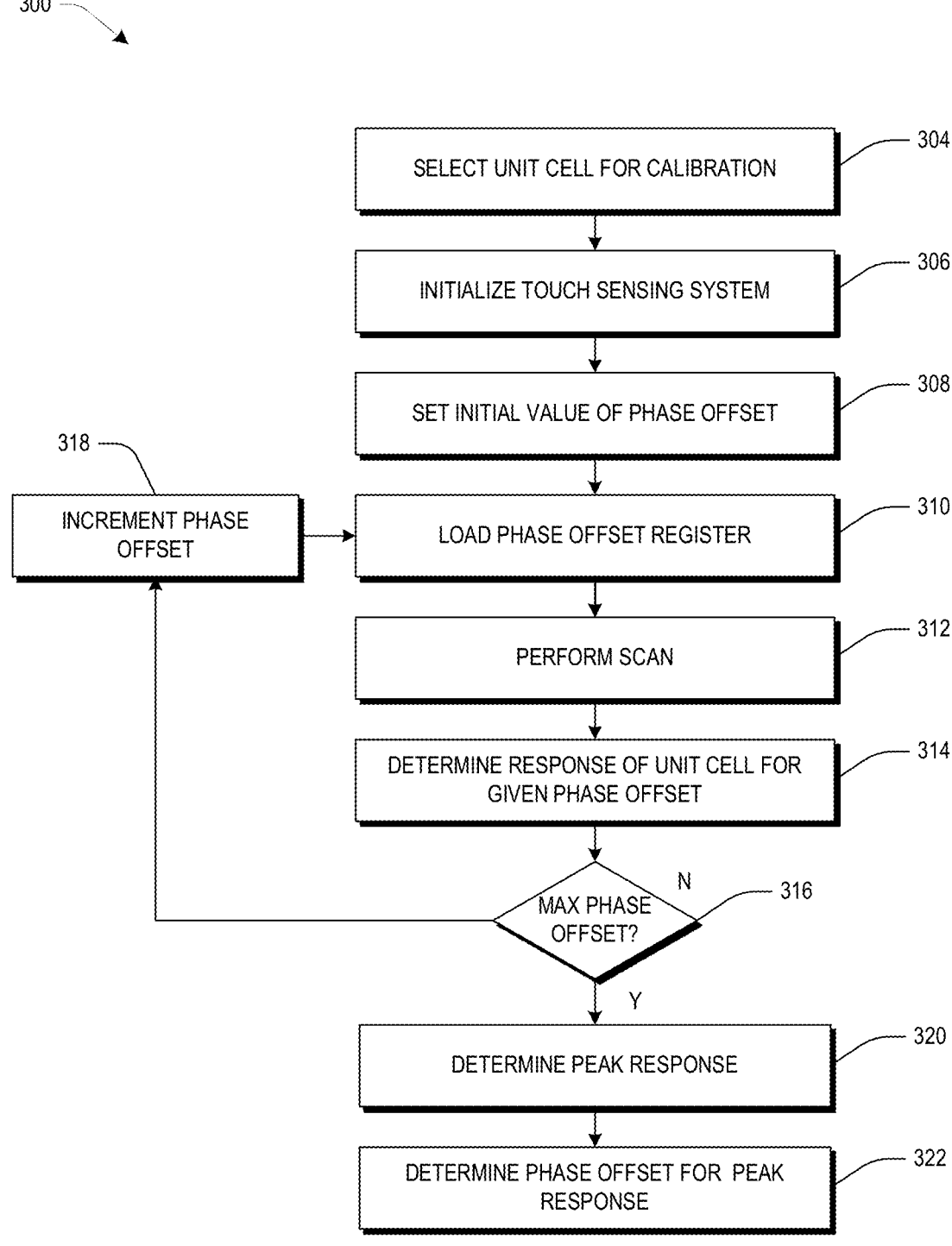

FIGS. 2 and 3 are diagrams of method 200, 300 for phase calibration of a touch sensing system 100, in accordance with some embodiments. At 204, the calibration unit 112 selects a first unit cell by configuring the multiplexer 106 to select a first TX line 104T and a first RX line 104R. At 206, the calibration unit 112 performs a source phase calibration for the first unit cell to generate a first phase offset. The method 300 of FIG. 3 describes one example technique for performing the source phase calibration. At 208, the calibration unit 112 selects a second unit cell by configuring the multiplexer 106 to select a second TX line 104T and a second RX line 104R. At 210, the calibration unit 112 performs a source phase calibration for the second unit cell to generate a second phase offset. At 212, the calibration unit 112 configures a phase offset parameter for the touch sensing system 100 based on the based on the first phase offset and the second phase offset.

Referring to FIG. 3, the method 300 illustrates determining a phase offset for a selected unit cell, for example, as performed at 206 or 210 of the method 200 in FIG. 2. At 304, a unit cell is selected for calibration by configuring the transmit sequencer 108 and the multiplexer 106. In some embodiments, the multiplexer 106 can be configured to select a single TX line 104T and a single RX line 104R. In another embodiment, the multiplexer 106 can be configured to select a single TX line 104T and the responses of all the RX lines 104R intersecting the selected TX line 104T are measured in parallel. In yet another embodiment, the multiplexer 106 may be configured to select a subset of the TX lines 104T and the transmit signal is applied to the subset. The multiplexer 106 may be configured to select one RX line 104R for each of the TX lines 104T in the subset so that the transmit signal from a given TX line 104T appears on only one of the RX lines 104R.

At 306, the touch sensing system 100 is initialized. For example, the parameters of the transmit signal ($V_{TX}$) and the demodulator reference signal ($V_{REF1 \ldots N}$) may be set. At 308, an initial value for a phase offset parameter is set and a phase offset parameter register is loaded at 310. In some embodiments, the phase offset parameter is a phase offset applied to the TX signal. Alternatively, the phase offset may be applied to the reference signal ($V_{REF1 \ldots N}$) of the selected unit cell. At 312, a scan of the touch sensor array 102 is performed. At 314, a response of the selected unit cell is determined for the given phase offset. In embodiments where the ADC module 110 measures the response of multiple RX lines 104R in parallel for a given transmit signal, the responses of the RX lines 104R not associated with the selected unit cell may be ignored. At 316, the calibration unit 112 determines if the maximum phase offset has been reached. If the maximum phase offset has not been reached, the calibration unit 112 increments the phase offset at 318 and loads the offset register at 310. The scan at 312 and the determining of the response at 314 is iterated until the maximum phase offset is reached at 316. The calibration unit 112 determines the peak response at 320 and determines the phase offset associated with the peak response at 322. In other words, at 320 the phase offset that leads the peak system response is determined. Returning to FIG. 2, the phase offset associated with the peak response for a first unit cell is used to generate the first phase offset at 206 and the phase offset associated with the peak response for a second unit cell is used to generate the second phase offset at 210.

Figure 4:
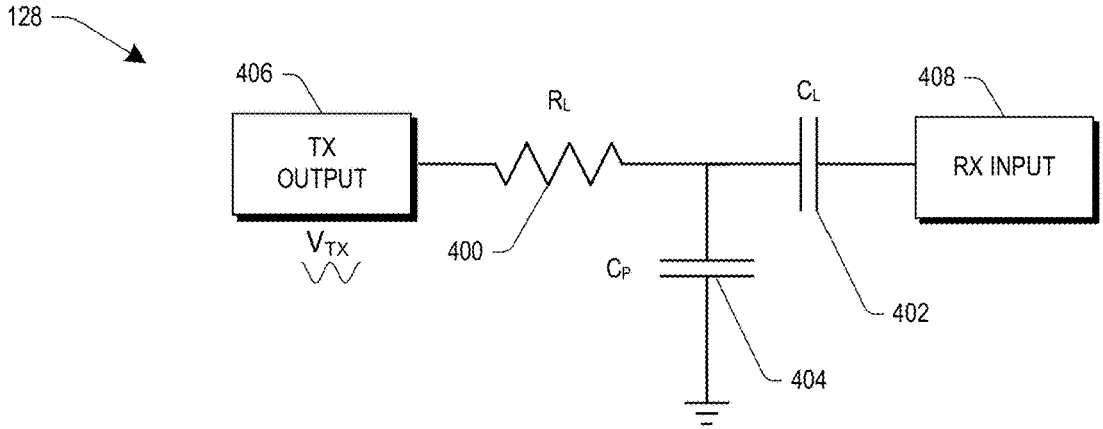
FIG. 4 is a diagram illustrating a touch panel model, in accordance with some embodiments.

In some embodiments, the calibration unit 112 employs a touch panel model 128 to perform the phase calibrations at 206 or 210 of FIG. 2. The touch panel model 128 may be used in determining the response of the unit cell for a given phase offset at 314 in FIG. 3. In some embodiments, and with reference to FIG. 4, the touch panel model 128 defines lumped resistance and capacitance parameters of a particular unit cell represented by a line resistance 400, a line capacitance 402, and a parasitic capacitance 404 for the unit cell. A TX output 406 specifying TX signal properties is provided to the lumped parameters of the unit cell and an RX input 408 is generated as an output of the touch panel model 128. The touch panel model 128 may be trained using actual measurements of touch panels 101 during manufacturing or by simulation. The touch panel model 128 may generate a response for any unit cell specified by row and column number or only for predetermined unit cells (i.e., the touch panel 128 model can be programmable). In the context of FIG. 3, the touch panel model 128 generates the panel response at 314. In some embodiments, the touch panel model 128 is used in applications where there the properties of the touch panel 101 are well characterized and exhibit a low level of variation between panels, or in high-noise environments where the readings are significantly impacted by the noise. The calibration unit 112 may use temperature data from the temperature sensor 126 as an input to the touch panel model 128. For example, the lumped resistance and capacitance parameters may be temperature dependent in some touch panel touch technologies (e.g., due to the panel insulation layer dielectric constant change).

In some embodiments, the calibration unit 112 may selectively use measured data or the touch panel model 128 to calibrate the phase offsets. The calibration unit 112 may compare the results from a calibration using measured data to a calibration using the touch panel model 128 to identify a noisy environment. For example, if the results differ by a predetermined threshold amount, the calibration unit 112 may use the results from the touch panel model 128.

Figure 5:
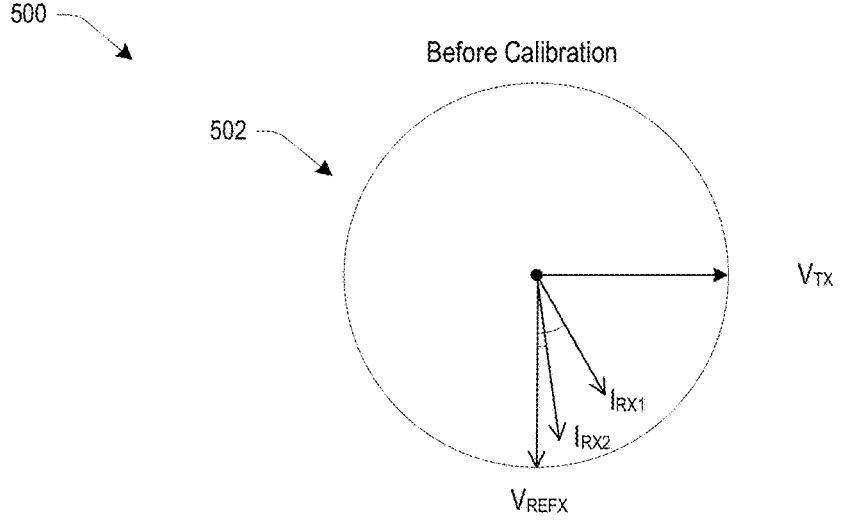
FIG. 5 is a diagram illustrating phase calibration, in accordance with some embodiments.
Figure 5:
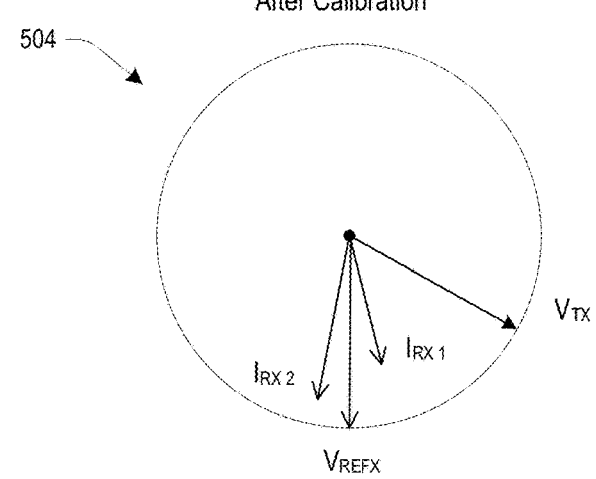

FIG. 5 is a diagram 500 illustrating an example phase diagram 502 prior to calibration and a phase diagram 504 after calibration. In the phasor diagram, the initial phase offset between the transmit signal ($V_{TX}$) and the demodulator reference signal ($V_{REF1 \ldots N}$) is 90°. The measured responses, $I_{RX1}$, $I_{RX2}$ of selected unit cells exhibit a first phase offset and a second phase offset with respect to the demodulator reference signal ($V_{REF1 \ldots N}$). In the phasor diagram 504, the phase angle of the transmit signal ($V_{TX}$) relative to the demodulator reference signal ($V_{REF1 \ldots N}$) is modified based on the first phase offset and a second phase offset resulting in the phase offsets for the response signals, $I_{RX1}$, $I_{RX2}$ of the selected unit cells exhibiting reduced phase offsets with respect to the demodulator reference signal ($V_{REF1 \ldots N}$). Calibrating the phase offset parameter for the touch sensing system 100 based on the first phase offset and the second phase offset improves performance of the touch sensing system by enabling more uniform system response for different touch locations and providing better immunity to noise (e.g., coming from a finger or the touch display 101) due to the higher touch response at the end.

In some embodiments, the phase offset parameter modified by the calibration unit 112 based on the first phase offset and the second phase offset is the phase offset associated with the transmit signal ($V_{TX}$). Alternatively, the phase offset parameter modified by the calibration unit 112 based on the first phase offset and the second phase offset is the phase offset associated with the demodulator reference signal ($V_{REF1 \ldots N}$).

In some embodiments, the phase offset parameter is globally associated with the touch sensing system 100. For example, in an embodiment where the SPU 114 uses a common reference source for each sensing channel 104C, the first phase offset may be determined for the unit cell at position 1, the second phase offset may be determined for the unit cell at position 2, and the first phase offset and the second phase offset may be averaged for determining the phase offset parameter to be applied to the transmit signal ($V_{TX}$) or the common demodulator reference signal ($V_{REF}$).

In an embodiment where the SPU 114 uses a different reference ($V_{REF1 \ldots N}$) for each sensing channel 104C, the calibration methods 200, 300 of FIGS. 2 and 3 may be conducted for each RX line 104R, where the first unit cell is selected at one end of the selected RX line 104R, and the second unit cell is selected at the other end of the selected RX line 104R (e.g., positions 1 and 3 for the uppermost RX line 104R or positions 4 and 2 for the lowermost RX line 104R). The first phase offset and the second phase offset for each RX line 104R may be averaged for determining the phase offset parameter to be applied to demodulator reference signal ($V_{REF1 \ldots N}$) of the selected RX line 104R.

In an embodiment where the SPU 114 uses a common reference for each sensing channel 104C, phase compensation may be provided for each TX line 104T by determining a different phase offset parameter for each TX line 104T generated based on the first phase offset at one end of the selected TX line 104T and the second phase offset at the other end of the selected TX line 104T. In this embodiment, the method 300 need only be performed once, as the peak responses and associated phase offsets for the end unit cells of the selected TX line 104T may be determined from the same set of iterative scan data. In some embodiments, the calibration procedure is performed periodically or in response to various trigger events, such as large touch panel temperature changes or other events that impact the parasitic capacitances and resistances of the lines 104T, 104R. The calibration unit 112 may trigger a calibration based on input from the temperature sensor 126, for example.

Figure 6:
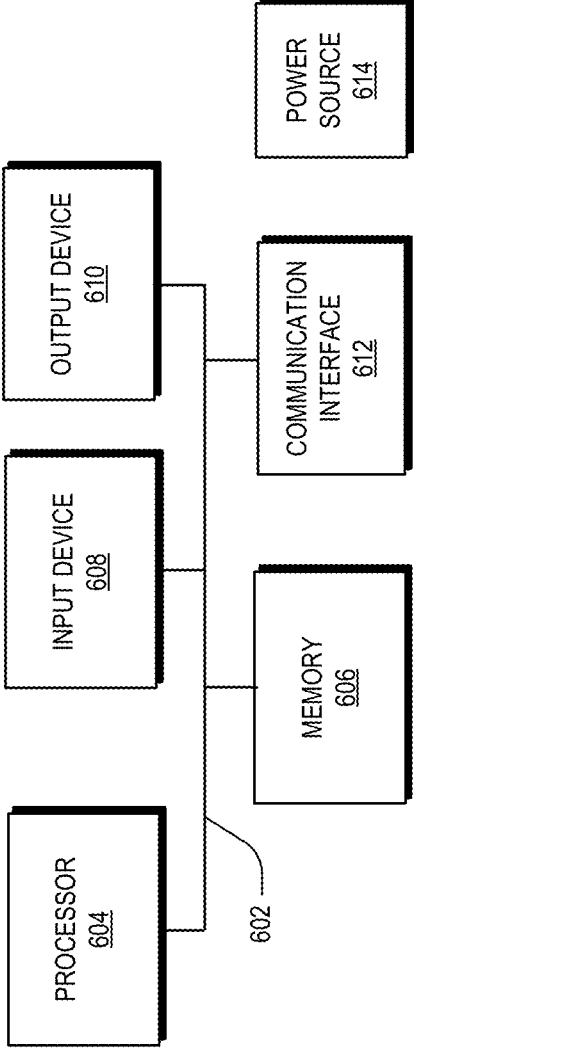
FIG. 6 is a diagram of a processing unit, in accordance with some embodiments.
Figure 6:

FIG. 6 is a diagram of a processing unit 600, in accordance with some embodiments. The processing unit 600 may implement one or more of the calibration unit 112, the SPU 114, or the post processing unit 116. In some embodiments, the processing unit 600 comprises a bus 602, a processor 604, a memory 606 that stores software instructions or operations, an input device 608, an output device 610, a communication interface 612, and a power source 614, such as a battery. The processing unit 600 may include fewer components, additional components, different components, and/or a different arrangement of components than those illustrated in FIG. 6.

According to some embodiments, the bus 602 includes a path that permits communication among the components of the processing unit 600. For example, the bus 602 may include a system bus, an address bus, a data bus, and/or a control bus. The bus 602 may also include bus drivers, bus arbiters, bus interfaces, clocks, and so forth. The processor 604 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 604 may be implemented as hardware (e.g., a microprocessor, etc.), a combination of hardware and software (e.g., a SoC, an ASIC, etc.), may include one or multiple memories (e.g., cache, etc.), etc.

The processor 604 performs one or multiple operations based on an operating system and/or various applications or computer programs (e.g., software). The processor 604 accesses instructions from the memory 606, from other components of the processing unit 600, and/or from a source external to the processing unit 600 (e.g., a network, another device, etc.). The processor 604 may perform an operation and/or a process based on various techniques including, for example, multithreading, parallel processing, pipelining, interleaving, etc.

In some embodiments, the memory 606 includes one or multiple memories and/or one or multiple other types of storage mediums. For example, the memory 606 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The memory 606 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The memory 606 may include drives for reading from and writing to the storage medium. The memory 606 may be external to and/or removable from the processing unit 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The memory 606 may store data, software, and/or instructions related to the operation of the touch sensing system 100.

The communication interface 612 permits the processing unit 600 to communicate with other devices, networks, systems, sensors, and/or the like on a network. The communication interface 612 may include one or multiple wireless interfaces and/or wired interfaces. For example, the communication interface 612 may include one or multiple transmitters and receivers, or transceivers. The communication interface 612 may operate according to a protocol stack and a communication standard. In some embodiments, the communication interface 612 includes an antenna. The communication interface 612 may include various processing logic or circuitry (e.g., multiplexing/de-multiplexing, filtering, amplifying, converting, error correction, etc.). In some embodiments, the communication interface 612 operates using one or more of a long range wireless protocol, a short range wireless protocol, or a wired protocol.

In some embodiments, the input device 608 permits an input into the processing unit 600. For example, the input device 608 may comprise a keyboard, a mouse, a display, a touchscreen, a touchless screen, a button, a switch, an input port, speech recognition logic, and/or some other type of suitable visual, auditory, or tactile input component. The touch sensor array 102 may be incorporated into the input device 608. The output device 610 permits an output from the processing unit 600. For example, the output device 610 may include a speaker, a display, a touchscreen, a touchless screen, a projected display, a light, an output port, and/or some other type of suitable visual, auditory, or tactile output component.

Figure 7:
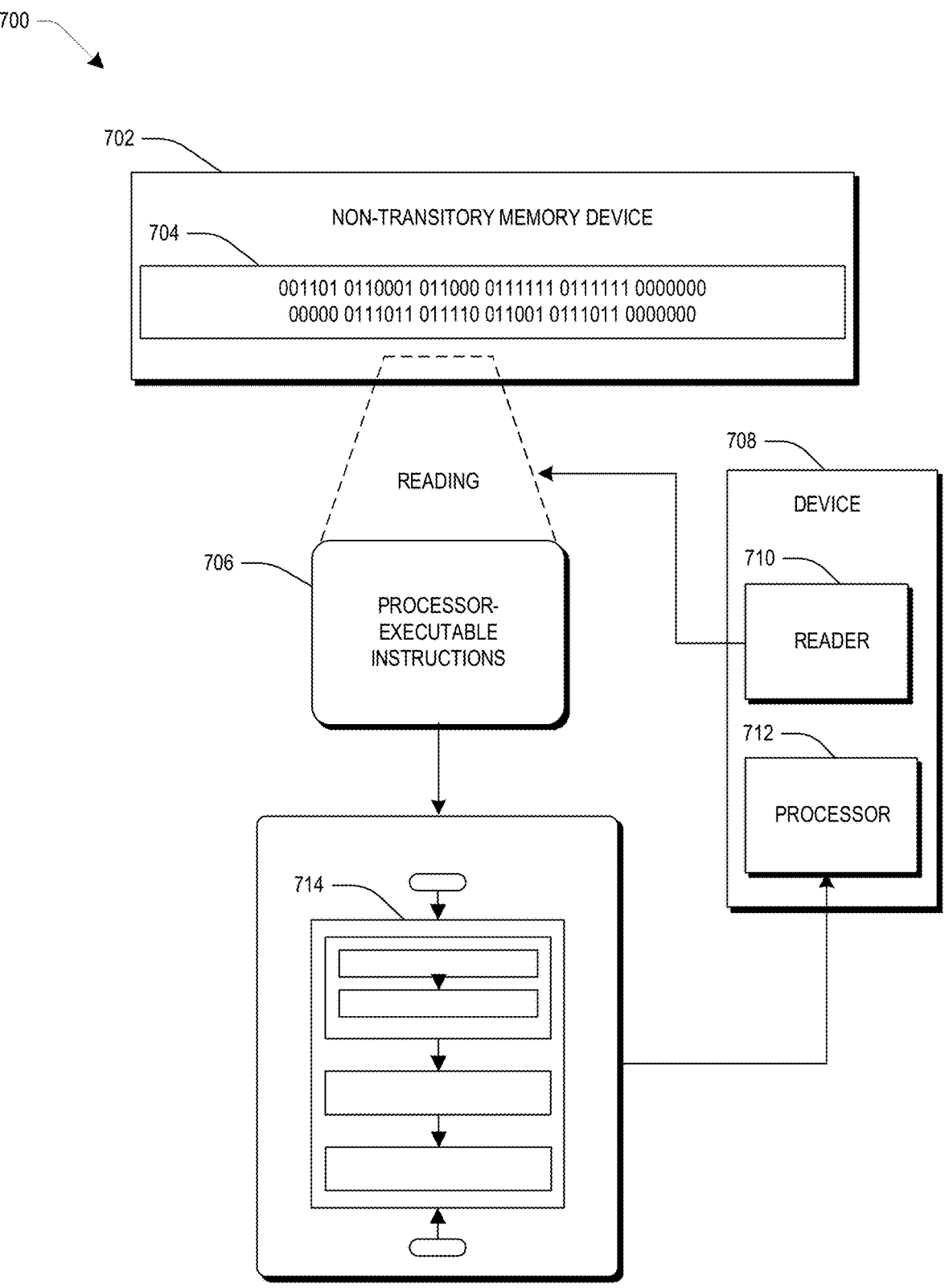
FIG. 7 illustrates an exemplary embodiment of a computer-readable medium, in accordance with some embodiments.

FIG. 7 illustrates an embodiment 700 of a computer-readable medium 702, in accordance with some embodiments. One or more embodiments involve a computer-readable medium comprising processor-executable instructions configured to implement one or more of the techniques presented herein. The embodiment 700 comprises a non-transitory computer-readable medium 702 (e.g., a CD-R, DVD-R, flash drive, a platter of a hard disk drive, etc.), on which is encoded computer-readable data 704. This computer-readable data 704 in turn comprises a set of processor-executable computer instructions 706 that, when executed by a computing device 708 including a reader 710 for reading the processor-executable computer instructions 706 and a processor 712 for executing the processor-executable computer instructions 706, are configured to facilitate operations according to one or more of the principles set forth herein. In some embodiments, the processor-executable computer instructions 706, when executed, are configured to facilitate performance of a method 714, such as at least some of the aforementioned method(s). In some embodiments, the processor-executable computer instructions 706, when executed, are configured to facilitate implementation of a system, such as at least some of the one or more aforementioned system(s). Many such computer-readable media may be devised by those of ordinary skill in the art that are configured to operate in accordance with the techniques presented herein.

In an embodiment of the techniques presented herein, a method for touch detection comprises determining a first phase offset for a first unit cell of a touch sensor array, determining a second phase offset for a second unit cell of the touch sensor array, and setting a phase offset parameter of the touch sensor array based on the first phase offset and the second phase offset.

In an embodiment of the techniques presented herein, the touch sensor array comprises transmit lines and receive lines, unit cells are defined at intersections of the transmit lines and the receive lines, and the phase offset parameter comprises a phase offset parameter of a transmit signal applied to the transmit lines.

In an embodiment of the techniques presented herein, the touch sensor array comprises transmit lines and receive lines, unit cells are defined at intersections of the transmit lines and the receive lines, and the phase offset parameter comprises a phase offset of a demodulator reference signal applied to outputs of the receive lines.

In an embodiment of the techniques presented herein, the touch sensor array comprises transmit lines and receive lines, unit cells are defined at intersections of the transmit lines and the receive lines, the first unit cell is located at a first end of a selected transmit line of the transmit lines, the second unit cell is located at a second end of the selected transmit line of the transmit lines, and the phase offset parameter comprises a phase offset of a transmit signal applied to the selected transmit line of the transmit lines.

In an embodiment of the techniques presented herein, the touch sensor array comprises transmit lines and receive lines, unit cells are defined at intersections of the transmit lines and the receive lines, the first unit cell is located at a first end of a selected receive line of the receive lines, the second unit cell is located at a second end of the selected receive line of the receive lines, the selected receive line of the receive lines is connected to a sensing channel comprising an analog-to-digital-converter, and a demodulator configured to multiply an output of the analog-to-digital converter by a demodulator reference signal, and the phase offset parameter comprises a phase offset of the demodulator reference signal.

In an embodiment of the techniques presented herein, determining the first phase offset comprises determining the first phase offset using a touch panel model, and determining the second phase offset comprises determining the second phase offset using the touch panel model.

In an embodiment of the techniques presented herein, a touch detection system comprises a touch sensor array comprising transmit lines, receive lines, and unit cells defined at intersections of the transmit lines and the receive lines, a transmit sequencer configured to generate a transmit signal on the transmit lines, an analog-to-digital-converter module configured to measure responses of the unit cells to the transmit signal, and a calibration unit configured to determine a first phase offset for a first unit cell of the unit cells based on a first response, of the responses, of the first unit cell, determine a second phase offset for a second unit cell of the unit cells based on a second response, of the responses, of the second unit cell, and set a phase offset parameter of the touch sensor array based on the first phase offset and the second phase offset.

In an embodiment of the techniques presented herein, the phase offset parameter comprises a phase offset parameter of the transmit signal.

In an embodiment of the techniques presented herein, the touch detection system comprises a demodulator connected to the analog-to-digital-converter module, wherein the phase offset parameter comprises a phase offset parameter of the demodulator.

In an embodiment of the techniques presented herein, the demodulator is configured to multiply an output of the analog-to-digital-converter module by a demodulator reference signal, and the phase offset parameter comprises a phase offset of the demodulator reference signal.

In an embodiment of the techniques presented herein, the first unit cell is located at a first end of a selected transmit line of the transmit lines, the second unit cell is located at a second end of the selected transmit line of the transmit lines, and the phase offset parameter comprises a phase offset applied to the transmit signal for the selected transmit line of the transmit lines.

In an embodiment of the techniques presented herein, the first unit cell is located at a first end of a selected receive line of the receive lines, the second unit cell is located at a second end of the selected receive line of the receive lines, the selected receive line of the receive lines is connected to a sensing channel comprising an analog-to-digital-converter, and a demodulator configured to multiply an output of the analog-to-digital converter by a demodulator reference signal, and the phase offset parameter comprises a phase offset of the demodulator reference signal.

In an embodiment of the techniques presented herein, the sensing channel comprises a filter connected to the demodulator configured to generate a response of the selected receive line of the receive lines based on an output of the demodulator.

In an embodiment of the techniques presented herein, the calibration unit is configured to determine the first phase offset using a touch panel model and determine the second phase offset using the touch panel model.

In an embodiment of the techniques presented herein, a device comprises a display comprising a touch sensor array having transmit lines, receive lines, and unit cells defined at intersections of the transmit lines and the receive lines, a transmit sequencer configured to generate transmit signals on the transmit lines of the touch sensor array, an analog-to-digital-converter module configured to measure responses of the receive lines to the transmit signals, and a calibration unit configured to determine a first phase offset for a first unit cell of the unit cells based on a first response, of the responses, of the first unit cell, determine a second phase offset for a second unit cell of a the unit cells based on a second response, of the responses, of the second unit cell, and set a phase offset parameter for at least one of one or more transmit lines of the transmit lines or one or more receive lines of the receive lines based on the first phase offset and the second phase offset.

In an embodiment of the techniques presented herein, the device comprises a demodulator connected to the analog-to-digital-converter module, wherein the phase offset parameter comprises a phase offset parameter of the demodulator.

In an embodiment of the techniques presented herein, the demodulator is configured to multiply an output of the analog-to-digital-converter module by a demodulator reference signal, and the phase offset parameter comprises a phase offset of the demodulator reference signal.

In an embodiment of the techniques presented herein, the first unit cell is located at a first end of a selected transmit line of the transmit lines, the second unit cell is located at a second end of the selected transmit line of the transmit lines, and the phase offset parameter comprises a phase offset applied to a transmit signal, of the transmit signals, for the selected transmit line of the transmit lines.

In an embodiment of the techniques presented herein, the device comprises a sensing channel connected to a selected receive line of the receive lines, comprising an analog-to-digital-converter in the analog-to-digital-converter module, a demodulator configured to multiply an output of the analog-to-digital converter by a demodulator reference signal, and a filter connected to the demodulator configured to generate a response of the selected receive line of the receive lines based on an output of the demodulator, wherein the first unit cell is located at a first end of the selected receive line of the receive lines, the second unit cell is located at a second end of the selected receive line of the receive lines, and the phase offset parameter comprises a phase offset of the demodulator reference signal.

In an embodiment of the techniques presented herein, the calibration unit is configured to determine the first phase offset using a touch panel model, and determine the second phase offset using the touch panel model.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

Any aspect or design described herein as an "example" and/or the like is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for touch detection, comprising:
determining a first phase offset for a first unit cell of a touch sensor array based on a measured response of the first unit cell;
determining a second phase offset for a second unit cell of the touch sensor array based on a measured response of the second unit cell;
determining a third phase offset for the first unit cell using a model of the touch sensor array;
determining a fourth phase offset for the second unit cell using the model of the touch sensor array; and
setting a phase offset parameter of the touch sensor array based on one of a measured response comprising the first phase offset and the second phase offset or a modeled response comprising the third phase offset and the fourth phase offset.

2. The method of claim 1, wherein:
the touch sensor array comprises transmit lines and receive lines;
unit cells are defined at intersections of the transmit lines and the receive lines; and
the phase offset parameter comprises a phase offset parameter of a transmit signal applied to the transmit lines.

3. The method of claim 1, wherein:
the touch sensor array comprises transmit lines and receive lines;
unit cells are defined at intersections of the transmit lines and the receive lines; and
the phase offset parameter comprises a phase offset of a demodulator connected to the receive lines.

4. The method of claim 3, wherein:
the demodulator is configured to multiply an output of an analog-to-digital converter connected to the receive lines by a demodulator reference signal; and
the phase offset parameter comprises a phase offset of the demodulator reference signal.

5. The method of claim 1, wherein:
the touch sensor array comprises transmit lines and receive lines;
unit cells are defined at intersections of the transmit lines and the receive lines;
the first unit cell is located at a first end of a selected transmit line of the transmit lines;
the second unit cell is located at a second end of the selected transmit line of the transmit lines; and
the phase offset parameter comprises a phase offset of a transmit signal applied to the selected transmit line of the transmit lines.

6. The method of claim 1, wherein:
the touch sensor array comprises transmit lines and receive lines;

13 unit cells are defined at intersections of the transmit lines and the receive lines;

the first unit cell is located at a first end of a selected receive line of the receive lines;

the second unit cell is located at a second end of the selected receive line of the receive lines;

the selected receive line of the receive lines is connected to a sensing channel comprising:

an analog-to-digital-converter; and a demodulator configured to multiply an output of the analog-to-digital converter by a demodulator reference signal; and the phase offset parameter comprises a phase offset of the demodulator reference signal.

7. The method of claim 1, wherein:

the model of the touch sensor array defines lumped resistance and capacitance parameters for the first unit cell and the second unit cell.

8. A touch detection system, comprising:

a touch sensor array comprising:

transmit lines;

receive lines; and unit cells defined at intersections of the transmit lines and the receive lines;

a transmit sequencer configured to generate a transmit signal on the transmit lines;

an analog-to-digital-converter module connected to the receive lines and configured to measure responses of the unit cells to the transmit signal;

a demodulator connected to the analog-to-digital-converter module; and a calibration unit configured to:

determine a first phase offset for a first unit cell of the unit cells based on a first response, of the responses, of the first unit cell;

determine a second phase offset for a second unit cell of the unit cells based on a second response, of the responses, of the second unit cell; and set a phase offset parameter of the demodulator based on the first phase offset and the second phase offset.

9. The touch detection system of claim 8, comprising:

a demodulator connected to the analog-to-digital-converter module, wherein:

the phase offset parameter comprises a phase offset parameter of the demodulator.

10. The touch detection system of claim 9, wherein:

the demodulator is configured to multiply an output of the analog-to-digital-converter module by a demodulator reference signal; and the phase offset parameter comprises a phase offset of the demodulator reference signal.

11. The touch detection system of claim 8, wherein:

the first unit cell is located at a first end of a selected transmit line of the transmit lines; and the second unit cell is located at a second end of the selected transmit line of the transmit lines.

12. The touch detection system of claim 8, wherein:

the first unit cell is located at a first end of a selected receive line of the receive lines;

the second unit cell is located at a second end of the selected receive line of the receive lines;

the selected receive line of the receive lines is connected to a sensing channel comprising:

an analog-to-digital-converter; and a demodulator configured to multiply an output of the analog-to-digital converter by a demodulator reference signal; and

14 the phase offset parameter comprises a phase offset of the demodulator reference signal.

13. The touch detection system of claim 12, wherein:

the sensing channel comprises:

a filter connected to the demodulator configured to generate a response of the selected receive line of the receive lines based on an output of the demodulator.

14. The touch detection system of claim 8, wherein:

the calibration unit is configured to:

determine a third phase offset for the first unit cell using a model of the touch sensor array determine a fourth phase offset for the second unit cell using the model of the touch sensor array; and select one of a measured response comprising the first phase offset and the second phase offset or a modeled response comprising the third phase offset and the fourth phase offset to set the phase offset parameter of the demodulator.

15. The touch detection system of claim 14, wherein:

the model of the touch sensor array defines lumped resistance and capacitance parameters for the first unit cell and the second unit cell.

16. A device, comprising:

a display comprising a touch sensor array having transmit lines, receive lines, and unit cells defined at intersections of the transmit lines and the receive lines;

a transmit sequencer configured to generate transmit signals on the transmit lines of the touch sensor array;

an analog-to-digital-converter module comprising a demodulator configured to measure responses of the receive lines to the transmit signals; and a calibration unit configured to:

determine a first phase offset for a first unit cell of the unit cells based on a first response, of the responses, of the first unit cell;

determine a second phase offset for a second unit cell of the unit cells based on a second response, of the responses, of the second unit cell; and set a phase offset parameter for the demodulator based on the first phase offset and the second phase offset.

17. The device of claim 16, wherein:

the demodulator is configured to multiply an output of the analog-to-digital-converter module by a demodulator reference signal; and the phase offset parameter comprises a phase offset of the demodulator reference signal.

18. The device of claim 16, comprising:

a sensing channel connected to a selected receive line of the receive lines, comprising:

an analog-to-digital-converter in the analog-to-digital-converter module and connected to the demodulator; and a filter connected to the demodulator and configured to generate a response of the selected receive line of the receive lines based on an output of the demodulator, wherein:

the first unit cell is located at a first end of the selected receive line of the receive lines;

the second unit cell is located at a second end of the selected receive line of the receive lines;

the demodulator is configured to multiply an output of the analog-to-digital converter by a demodulator reference signal; and the phase offset parameter comprises a phase offset of the demodulator reference signal.

19. The device of claim 16, wherein:

the calibration unit is configured to:

determine a third phase offset for the first unit cell using a model of the touch sensor array determine a fourth phase offset for the second unit cell using the model of the touch sensor array; and select one of a measured response comprising the first phase offset and the second phase offset or a modeled response comprising the third phase offset and the fourth phase offset to set the phase offset parameter of the demodulator.

20. The device of claim 19, wherein:

the model of the touch sensor array defines lumped resistance and capacitance parameters for the first unit cell and the second unit cell.

\* \* \* \* \*